Sept. 14, 1965 W. R. MACLAY 3,206,740

ANALOG TO DIGITAL CONVERTER

Filed Nov. 19, 1962 3 Sheets-Sheet 1

INVENTOR
WILLIAM R. MACLAY

BY George [signature]
ATTORNEY

Sept. 14, 1965 W. R. MACLAY 3,206,740

ANALOG TO DIGITAL CONVERTER

Filed Nov. 19, 1962 3 Sheets-Sheet 3

3,206,740
ANALOG TO DIGITAL CONVERTER
William R. Maclay, Endicott, N.Y., assignor to International Business Machines Corporation, New York, N.Y., a corporation of New York
Filed Nov. 19, 1962, Ser. No. 238,498
4 Claims. (Cl. 340—347)

The invention is generally concerned with a device for converting an analog quantity to a digital quantity, and more particularly to the conversion of a mechanical rotational movement into an electric signal in digital form representative of such movement.

In analog to digital converters for changing the form of, as here, the angular disposition of a shaft into a corresponding coded electric signal representative of this disposition, the conversion to digital form is usually accomplished in order to utilize the inherently high operational speed and accuracy of electronic digital computers.

One form of such a converter that has found wide usage comprises a generally disc-like member which is axiallly driven or rotated through an angular distance having a functional relationship to the analog quantity being digitized. The member is provided with a plurality of information paths on a major surface arranged in concentric circles about the axis of rotation as a common center. Each of the paths, or courses, is composed of alternating areas of electrically conductive and non-conductive areas where the numbers of such areas in the different paths have a binary coded relation to one another, or some other defined functional relationship. Brushes are disposed in contacting relation to the information paths and a plurality of signals are obtained via the brushes collectively providing a coded picture of the exact angular situation of the disc relative to the brushes, or some other reference point.

In a device of this general type, one or more brushes can at times be situated between conducting and nonconducting areas resulting in ambiguous indications. For this reason various special techniques have been developed to compensate for, or eliminate, such ambiguities and the resultant errors on digital conversion. One such technique is the provision of a pair of brushes per information path with external circuit arrangements enabling the patterned selection of one brush from each pair during read-out in such manner as to average out any ambiguity of brush positioning which may exist.

Further, where high accuracy is required it is necessary to obtain a highly precise spacing arrangement of the conductive areas with respect to each other. Also, brush wear tends to produce changing reading conditions which contributes an error of a size corresponding to the amount of wear and the number and electrical relation of the brushes. The magnitude of effect of the first noted condition can be readily appreciated when it is realized that such discs frequently have a diameter of but several inches and are provided with a great number of conductive segments disposed along the disc periphery such that, heretofore, both the leading and trailing edges of each segment had to be exactly located, or a relatively large error could result. As to brush wear and its effects, unless special circuit means are provided faulty operation of the brushes is not readily detachable and can contribute a considerable error.

It is therefore a primary object of the invention to provide a disc-type analog-to-digital device having a reduced number of information paths and a simplified brush read-out system.

Another object of the invention is to provide such a conversion device in which a single course of spaced conductive areas is utilized for establishing digital identification of the disc angular disposition.

Yet another object of the invention is the provision of a disc digitizing device wherein accurate mutual positioning relationship of the conductive segments is only required at a single edge or end of each segment.

A further object of the invention is the provision of such a device in which a decoding circuit network is an integral part of the converter.

In brief, it is the contemplation here to provide a disc-like insulating member having a single row of information segments arranged in an equally spaced relation along the periphery. Brush read-out means are arranged in longitudinally staggered reading relation to the segments. An interpreting matrix is carried by the disc-like body and interrelates the segments and read-out means such that electric signals are obtained representative of the shaft angle position. Further, a special circuit is provided for eliminating ambiguities in reading resulting from anomalous dispositions of the brush means.

The foregoing and other objects, features and advantages of the invention will be apparent from the following more particular description of preferred embodiments of the invention, as illustrated in the accompanying drawings.

Figure 6:
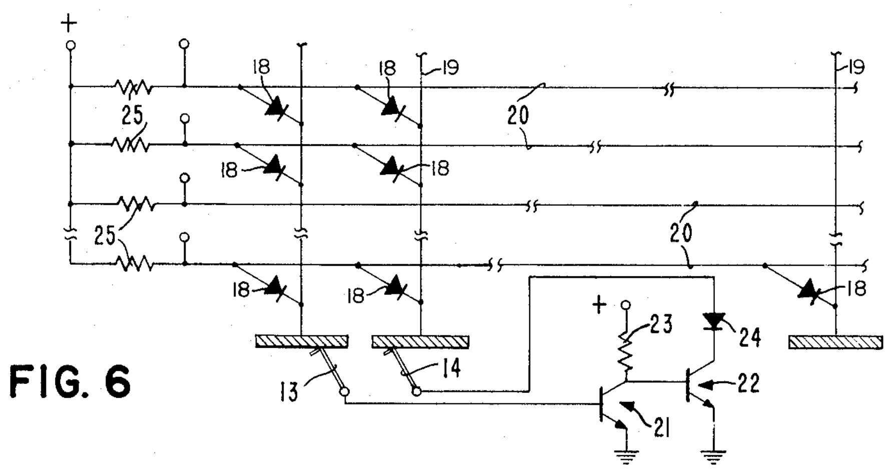

FIGURES *5a, b* and *c* ilustrate, respectively, the three different possible brush contacting relationships;

FIGURE 6 is a circuit schematic for controlling brush operation; and

Figure 7:
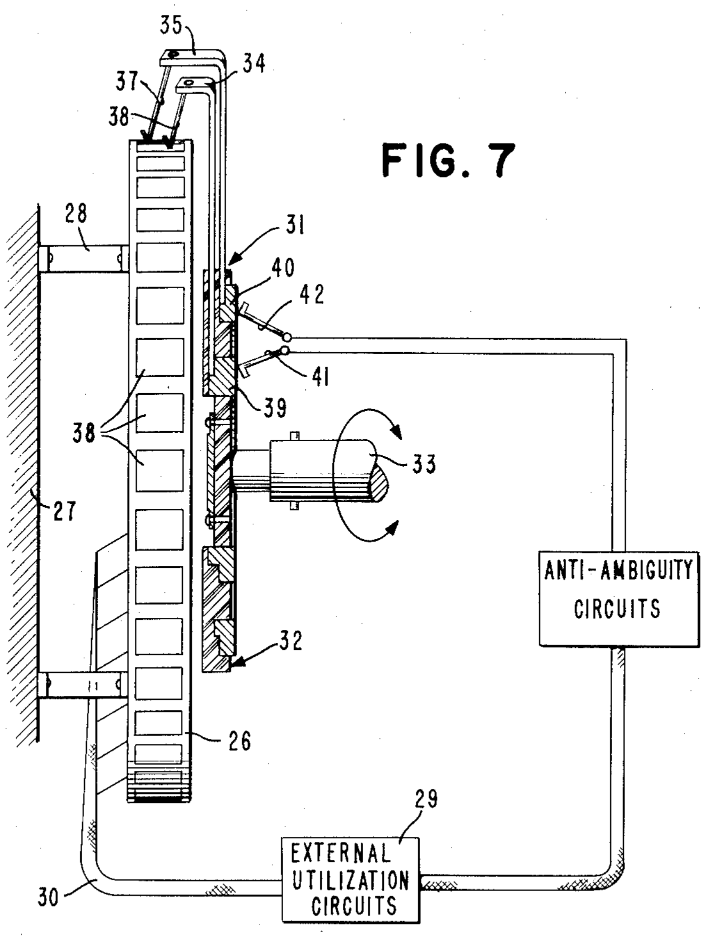

FIGURE 7 is a perspective view of an alternate embodiment of the invention.

Figure 1:
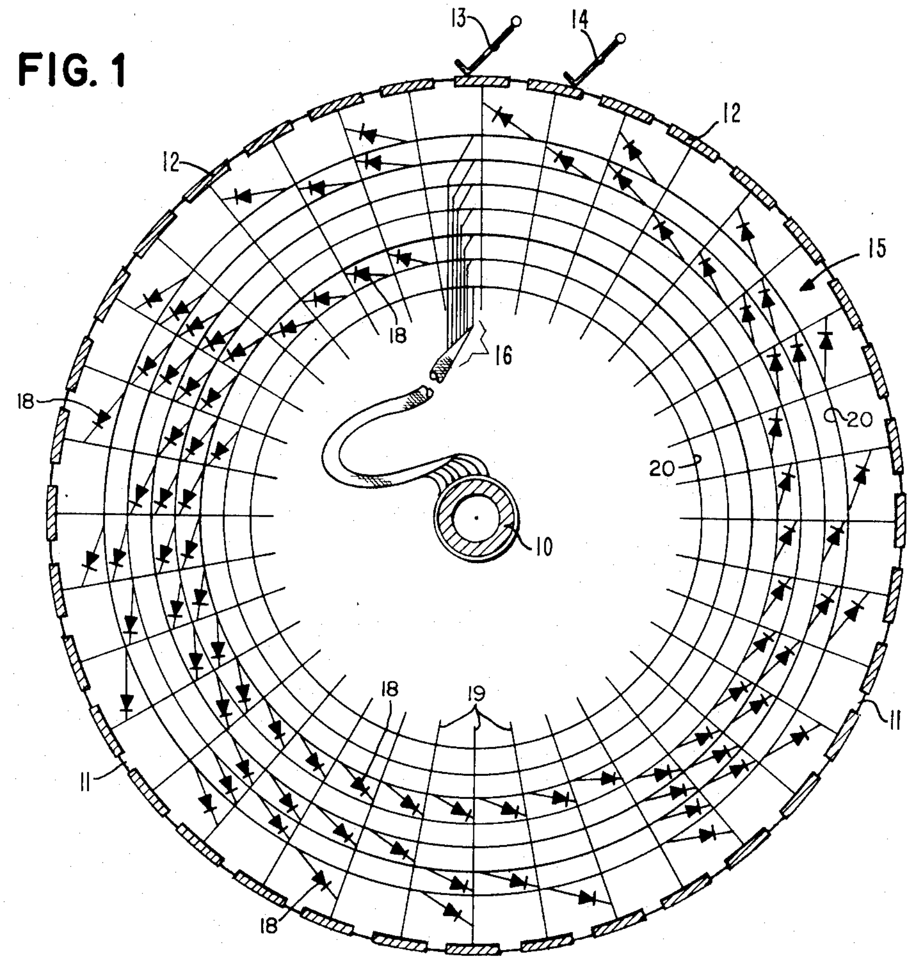
FIGURE 1 is a perspective view of the code disc converter of the invention showing the general layout of the interpreting matrix and interconnection means.

In its major features the analog-to-digital converting device of FIGURE 1 comprises a rotative motion transmitting shaft 10 fixedly secured to the center of a disc-like base 11 of a suitable electrical insulator, such that rotation of the shaft effects a similar rotation of the base in the same direction about the shaft as an axis. The periphery of the disc is provided with a plurality of conducting segments 12 arranged in an equally spaced, manually insulated manner. Electrical contact with the segments for indication purposes is accomplished via a pair of brushes 13 and 14, which in this embodiment are considered as being mounted in a fixed manner adjacent the base 11 with changes in disposition effected solely by movement of the base therepast.

As indicated generally at 15, a decoding or interpreting matrix is provided integral with a mjor surface of the converter disc for indicating, in a way that will be set forth below, a precise position of the shaft and disc relative to the brushes 13 and 14. A plurality of information signal lines, shown at 16, interconnect the matrix 15 with appropriate commutator segments 17 for relating to external equipment (not shown).

Although the connection scheme is clearly a feasible one, another embodiment of the invention set forth later herein contemplates that instead of the shaft and disc being turned as in the previously described device, they be kept in a fixed position while rotative movements to be measured are applied to the brushes 13 and 14 as a unit. In this case, commutation for the information lines is unnecessary and a straight-through electrical connection is sufficient in this regard.

Figure 3:
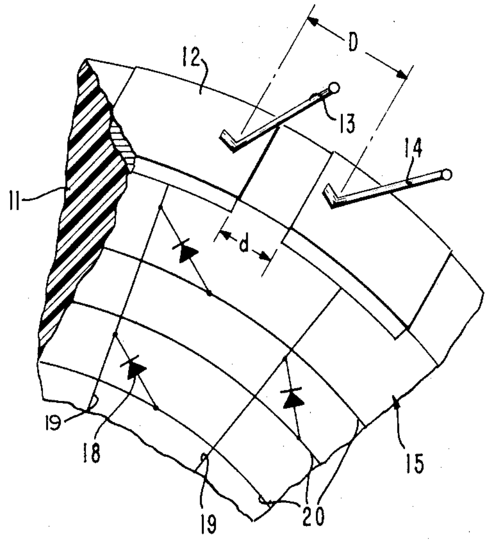
FIGURE 3 is an enlarged fragmentary view of the code disc illustrating its conductive segments and adjacent details.
Figure 4:
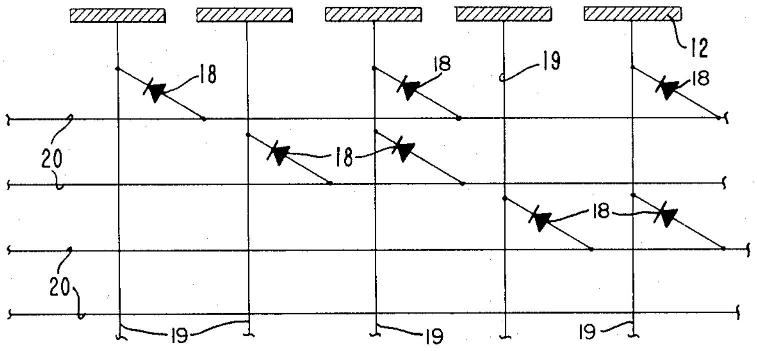
FIGURE 4 is a schematic representation of one form of interpreting matrix.

Turning now particularly to FIGURE 3 and the details of the converter disc in the region adjacent the segments, it is seen that the individual segments are substantially rectangular members embedded in the preiphery of the disc 11 and extending completely through the disc body from one major face to the other with the peripheral surfaces in exposed relation. The facing edges of the different segments are orthogonal to a circumference line and parallel to one another. The segments are constructed from a good electrical conductor, such as copper, with the disc base being made of a good insulator. Any one of a number of synthetic resins provide the requisite high insulation properties for a satisfactory base, as well as the desirable characteristics of being able to maintain a consistent geometry throughout a wide range of temperatures and having poor moisture absorption ability.

The brushes 13 and 14 can be of the conventional wire spring type having an extremity formed into a generally V-shape for restingly contacting the periphery of the disc and the embedded segments. They are arranged in staggered relation along the circumference of the disc such that the distance D between the contacting points of the brushes is sufficient to span the insulation distance *d* between adjacent segments, but short enough so that the brushes can both be positioned in contact with the same segment. The purpose of this special spacing relation of the brushes and segments is to prevent certain ambiguities in reading in a way that will be set forth below. As will be clarified, an important feature of the invention is that despite having only a single set of conducting segments separated by areas that are nonconducting, a continuous indication of the mechanical relation of the brushes and disc is obtained throughout 360° of possible rotative motion.

Figure 2:
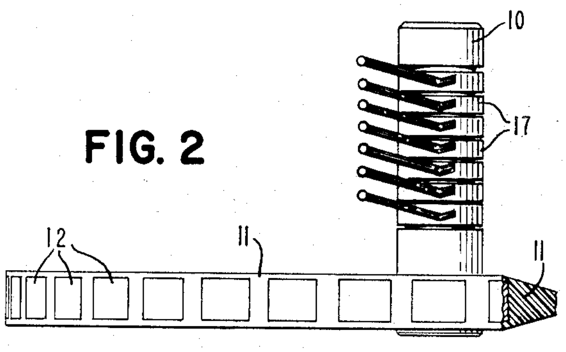
FIGURE 2 is a fragmentary enlarged view of external connections to the converter.

As can be seen best in FIGURE 3, the interpreting matrix 15 comprises a plurality of diodes 18 arranged on a major surface of the disc 11 and specially interconnect with the different segments 12 and commutators such that an energization pulse via brushes 13 and 14 makes its way along a coded path and is emitted at a corresponding information line 16. Each conducting segment is provided with a separate connection lead 19, which are shown in FIGURES 1 and 2 as radially extending lines. A set of code lines 20 are arranged to cross over the leads 19, yet are maintained electrically insulated from them except for selected interconnections via the diodes 18. Accordingly, when a brush communicates an electric signal to a particular segment 12 this signal is provided an electrical path along the respective lead 19, one or more diodes 18 and the corresponding code lines 20 to the information lines 16 for external utilization. Particularly in regard to the described embodiment, there are one hundred twenty-eight (128) segments 12 which are fully identifiable by seven information lines 16 individually connected to the respective code lines and segments via the diodes. The following table indicates the coded identifying signal arrangements for certain of the segments with the numbers in parentheses being an arbitrary designation in the interests of clarity and ease of understanding:

| Segment number: | Code lines |
|---|---|
| (1) | (1) |
| (2) | (2) |
| (3) | (2), (1) |
| (4) | (4) |
| (5) | (4), (1) |
| (6) | (4), (2) |
| (7) | (4), (2), (1) |

It is seen that the numerals in parentheses assigned to the code lines 20 (and information lines 16) have a relation such that the sum of code line numbers of activated lines identifies the particular segment that is in contacting relation with the brushes.

An important aspect of the invention is the provision of the interpreting matrix 15 in such a form as to enable it to be carried on a surface of the disc itself thereby achieving an integral structure. Although, it may be possible in certain cases to use discrete diodes with customary wire connections to form such a matrix, this is generally not feasible due to size and weight limitations. Accordingly, the contemplation here is to obtain the connection leads 19, code lines 20, and the diodes by deposition techniques, or more specifically, by the application of what is sometimes called thin film microcircuit methods. Deposition of electrical conductors can be satisfactorily accomplished by providing a thin metallic coating on the insulative base of a good conductor such as copper, depositing a resist over the coating in a pattern of the desired circuit configuration, etching away the exposed coating and removing the resist to leave the circuit conductors. A suitable technique for providing the diodes is to be found in "Electronic Design," vol. 10, No. 1, January 4, 1962, beginning on page 40.

As these techniques are applied here, a layer of deposited (or thin film) circuits corresponding to the vertical leads 19 are provided directly onto the insulator base 11 and electrically connected to their respective segments 12. Next, a covering layer of insulating material is applied over the first circuit. A final set of conductors corresponding to the code lines 20 is formed over the insulating layer in the same manner as the leads 19. The final step is the production of diode junctions at selected crossover points of the two sets of conductors in the manner and according to the configuration set forth previously.

As noted earlier, difficulties can arise in the nature of ambiguities of readings which in order to provide a fully satisfactory unit must be eliminated or adequately compensated for in some manner. In particular, circuit means are provided here for overcoming the ambiguous reading conditions that would result, say for example, when the brushes 13 and 14 contact adjacent segments at the same time. The circuit of FIGURE 6 illustrates such an anti-ambiguity means which in its broadest definition can be considered to comprise a switching device that maintains one, and only one, of the brushes in electrical operating relation to the segments at any one time.

As to the specific connective aspects, reference should be made now to FIGURE 6. Brush 13 is connected to the base of an NPN transistor 21 the emitter of which is grounded. The collector is fed into the base of a second NPN transistor 22 and provided with positive bias voltage via a scaling resistor 23. Brush 14 is connected to the anode of a diode 24 the cathode of which is fed into the collector of the second transistor 22. The emitter of transistor 22 is set to ground potential.

In operation, when brush 13 is in contact with a segment 12 current will flow through the respective lead 19, associated diodes 18 and the corresponding code lines 20. Also, conduction of the transistor 21 establishes a state of non-conduction in the transistor 22. On the other hand when the brush 13 comes into contact with an insulated portion of the base 11, the transistor 21 is shut off which simultaneously causes the base of the transistor 22 to be positively biased via the resistor 23. Current can now flow through the brush 14 and the associated circuit of the segment with which the brush is in contact.

A positive bias voltage is provided from a suitable source (not shown) through bias resistors 25 to the code lines 20. The information lines 16 are tapped off the code lines 20 as shown.

Figure 5A:
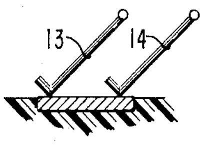
Figure 5B:
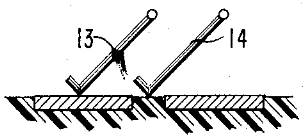
Figure 5C:
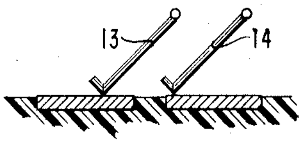

To fully illustrate the application of the anti-ambiguity circuit, reference should be made to FIGURE 5 keeping in mind the theory of operation discussed in the immediately preceding paragraphs. FIGURE *5a* shows the condition where both brushes simultaneously contact the same segment, at which time the brush 13 provides a signal current via certain diodes in the matrix in the manner described thereby indicating the relative shaft position while simultaneously inactivating the brush 14. Relocation of the brushes to the position shown in FIGURE *5b* with brush 13 contacting a segment and the brush 14 contacting an adjacent insulating portion of the disc base results in the same circuit condition as that where both brushes are on the same segment. A third condition where the brushes individually contact different segments is electrically the same as the previously two discussed conditions despite the difference in electrical paths for the two brushes. The last condition is where brush 14 resides on a segment and brush 13 rests on an insulating portion of the base, in which case the operative sensing condition is switched from brush 13 to brush 14.

Representative components and bias voltage values are as follows:

| | |
|---|---|
| Transistors **21, 22** | 2N914. |
| Resistors **23** | 4,000 ohms. |
| Diode **24** | FD–600, silicon. |
| Resistors **25** | 4,000 ohms. |
| Bias voltages | 8.5 v. D. C. |

The advantageous effect of switching the operative, or sensing condition from one brush to another, yet maintaining one of the brushes in operative condition at all times, insures that there is no "dead" space on the converter and that a signal is obtained for any position of the shaft throughout a full 360 degrees of rotation.

FIGURE 7 represents an alternate embodiment of the invention in which rotative motion to be interpreted is applied to a brush system that rotates about a fixed segment-carrying base, rather than moving the base relative to a fixed brush system as in the previously described version. A circular disc-like base 26, constructed in the same general manner as the base 11, is fixedly secured to a reference member 27 by supports 28. Electrical connection from the base 26 to external utilization circuits 29 is provided by a cable 30 which can be directly connected to lines corresponding to code lines 20 of the previously discussed device.

The brush assembly 31 consists of an insulative base member 32 fixedly coupled to an input shaft 33 such that rotation of the shaft effects an identical rotation of the base member 32. A pair of electrically conducting support arms 34 and 35 extend radially from the periphery of the base 32 for disposing a pair of brushes 36 and 37, respectively, in contacting relation to the segments 38 of the base 26. A pair of concentric conducting rings 39 and 40 carried on an outer major surface of the base member 32 are respectively and separately connected to the brushes 36 and 37 for providing external connections via commutator brushes 41 and 42. Other than the mechanical differences noted, the theory of operation and associated electrical circuitry are identical with the first described device.

In accordance with the practice of the invention there is provided an analog-digital conversion device which is able to use fewer sensing brushes than the conventional multi-information-course converters without sacrificing accuracy. In fact, due to the reduction in number of brushes a significant source of error is eliminated.

A further advantage that accrues as a result of having fewer brushes is a lessening of brush friction which is reflected in an associated servo system as a tendency to maintain static positions, sometimes termed "stiction."

Although the foregoing description and discussion have been directed toward a device having as its explicit function the binary digitizing of a shaft position, it is considered that the invention properly can include other closely related functions. For example, by mere change of the matrix coding scheme a direct read-out in a 10-base number system, or to any other radix, can be obtained.

It is also felt that by using specially coded replaceable matrices the invention can be readily adapted for cryptographic purposes, that is, as a coder-decoder.

While the invention has been particularly shown and described with reference to preferred embodiments thereof, it will be understood by those skilled in the art that the foregoing and other changes in form and details may be made therein without departing from the spirit and scope of the invention.

What is claimed is:

1. An analog-digital conversion apparatus, comprising:
a base member of an electrically insulating material;
spaced individual conducting areas carried by said member;
electrical brush means mounted adjacent the member;
means for providing relative movement between the member and the brush means such that said brush means are successively passed into and out of electrical wiping contact with the areas; and
a diode matrix carried by said member as an integral part thereof electrically connected to said areas providing special coded electrical paths for each of said areas.

2. A shaft angle digitizing apparatus, comprising:
a disc-like base member having the shaft axially affixed thereto for turning member an amount functionally related to an analog quantity;
spaced conducting segments arranged in a closed path about the shaft on the periphery of the member;
means fixedly mounted adjacent the member for electrically intercepting the conducting segments as the member moves therepast;
an electrical signal source connected to said intercepting means; and
a diode matrix coding means carried by said member provided with fixed electrical connections to the segments and having selective output connections to provide substantially simultaneously existing coded digital electrical signals representative of the analog quantity.

3. A shaft angle digitizer, comprising:
a circular disc-like member of an electrical insulating material mounted for rotation with said shaft as an axis;
a single row of conductive areas arranged in an equally spaced relation along the periphery of the member;
a deposited decoding matrix carried on a major surface of the member selectively interconnected with the conductive areas;
commutator rings carried by the shaft and appropriately connected to said matrix;
connecting means located adjacent for contactingly engaging the periphery of said member such that relative movement of the member with respect to the connecting means provides successive engagements with the conductive areas; and
an electrical signal source operatively related to the connecting means whereby the relative position of the member to said connecting means is determined by a coded set of signals present at the different commutator rings.

4. In shaft digitizing apparatus including an insulative disc provided with conductive areas arranged in a circular pattern adjacent the margins thereof and brush means for contacting the areas and directing electric signals thereto, the improvement comprising, a deposited decoding means carried on a major surface of the disc, said means including a plurality of concentric closed-path conductors deposited on said surface, a radially extending conductor electrically associated with each conductive area, diode means selectively interconnecting said closed-path conductors with said radially extending conductors such that the pattern of signals made available to the closed-path conductors via the brush means is a functional representation of the relative angular disposition of the disc to the brush means.

References Cited by the Examiner

UNITED STATES PATENTS

| | | | |
|---|---|---|---|
| 2,826,252 | 3/58 | Dickstein | 340—347 |
| 2,962,705 | 11/60 | Relis et al. | 340—347 |
| 3,045,157 | 7/62 | Jacquet et al. | 340—347 |

MALCOLM A. MORRISON, *Primary Examiner.*